3,070,552
POLYAMINES

Giuliana C. Tesoro, Dobbs Ferry, N.Y., Emery I. Valko, Mountain Lakes, N.J., and Aaron Freiman, Brooklyn, N.Y., assignors to Onyx Oil & Chemical Company, Jersey City, N.J., a corporation of Delaware
No Drawing. Filed June 17, 1957, Ser. No. 666,234
12 Claims. (Cl. 260—2.1)

This invention relates to new reaction products of aliphatic primary monoamines with nitrogen alkylating diester compounds.

The invention includes the preparation of water soluble polymers of aliphatic primary monoamines with alkylating diester compounds and particularly polyethylene glycol compounds, the new water soluble products so produced, and cross-linked insoluble products produced therefrom. The invention also includes an improved method of finishing textile materials, and particularly of hydrophobic textile materials to impart durable antistatic properties thereto and to impart improved dyeing properties thereto.

The soluble polytertiary amines of this invention contain tertiary nitrogen atoms and alkoxy groups in the linear molecular chain, and the preparation of these amines may be represented as follows:

$R_1NH_2 + XCH_2CH_2(OCH_2CH_2)_mOR_2O(CH_2CH_2O)_nCH_2CH_2X =$

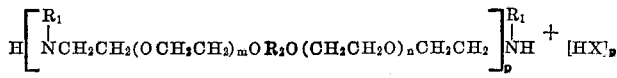

wherein $R_1$ is the residue of a primary monoamine after the removal of the primary $NH_2$ group, $R_2$ is an organic divalent radical, $m$ and $n$ are average numbers between 3 and 40, and $p$ is an integer greater than 1.

Various aliphatic primary monoamines can be used in the preparation of the products of the invention including primary monoamines represented by the general formula $$R_1NH_2$$

where $R_1$ is an uninterrupted, unsubstituted alkyl or alkene radical, an interrupted alkyl or alkene radical interrupted by one or more hetero atoms such as N, O, S, and the like, or a substituted alkyl or alkene radical in which one or more of the hydrogen atoms is substituted by methyl groups, hydroxyl groups, and the like.

Examples of such aliphatic primary monoamines suitable for use in preparing the new products of this invention include methylamine, ethylamine, propylamine, butylamine, amylamine, hexylamine, dodecylamine, allylamine, monoethanol amine, 3 isopropyl-n-propyl amine, 3 methoxy-n-propyl amine, and the like. Mixtures of the amines can also be used.

The nitrogen alkylating diester compounds which can be used as alkylating agents for the amines in making the new products include alkylene and aralkylene alkylating diesters and the alkylating diesters of polyethylene glycols and polyethylene glycol derivatives.

Examples of alkylene and aralkylene alkylating diesters are the diiodides, dichlorides, and dibromides of ethylene, hexamethylene, di (chloromethyl) benzene, and the like.

The nitrogen alkylating diesters of polyethylene glycols are particularly suited for reacting with the primary monoamines. The alkylating diesters of polyethylene glycols which can be used include those represented by the following general formula:

$$X(CH_2CH_2O)_nCH_2CH_2X$$

where X is the ester forming residue of an inorganic acid or of an organically substituted sulfuric, phosphoric, or sulfonic acid such as Cl, Br, I, $CH_3SO_3$, $OSO_3H$, and the like, and where $n$ is an average number between 1 and 100. These anions of the acid replace the two terminal OH groups of the glycol.

Examples of alkylating diesters of polyethylene glycols are the diiodides and dichlorides of triethylene glycol and polyethylene glycols having higher average molecular weights of e.g., about 300, about 600, about 1000, about 1540, etc. or mixtures thereof.

The nitrogen alkylating diesters of polyethylene glycol derivatives which can be used include those represented by the general formula $$XCH_2CH_2(OCH_2CH_2)_mOR_2O(CH_2CH_2O)_nCH_2CH_2X$$

where $m$ and $n$ are average numbers between 3 and 40, and $R_2$ is a divalent radical such as, for example, a glycol radical, a dibasic acid radical OCACO, where A is the intermediate divalent radical of the dibasic acid or a diurethane radical OCNHANHCO where A is again an intermediate divalent radical of the diurethane, and where X is the ester forming residue of an inorganic acid or of an organically substituted sulfuric, phosphoric, and sulfonic acid such as Cl, Br, I, $CH_3SO_3$, $OSO_3H$, and the like.

Some examples of such polyethylene glycol derivatives include polyethylene glycol di-p-toluene sulfonates, polyethylene glycol dimethanesulfonates, and the like.

The polyethylene glycol diesters can be prepared by appropriate esterification reactions. For example, polyethylene glycol dichlorides can be prepared by reacting polyethylene glycols with thionyl chloride in the presence of pyridine or other base. Polyethylene glycol diiodides can be prepared by reacting polyethylene glycol dichlorides with equivalent amounts of sodium iodide either in absence of a solvent, or in presence of a solvent in which the sodium chloride formed as by-product is essentially insoluble, such as acetone. Polyethylene glycol disulfates can be prepared in the form of their ammonium salts by reacting the glycols with equivalent amounts of sulfamic acid. Polyethylene glycol di-p-toluene sulfonates can be prepared by reacting the glycols with p-toluene sulfonyl chloride in presence of equivalent amounts of pyridine (or other base). Polyethylene glycol dimethanesulfonates can be prepared by reacting the glycols with methane sulfonyl chloride in presence of equivalent amounts of pyridine (or other base).

The polyglycol dihalides which contain a dibasic acid radical between the polyglycol chains can be prepared from a dibasic acid or anhydride by esterification with the polyethylene glycol halohydrin. The polyglycol esters which contain a diurethane radical between the polyglycol chains can be prepared by addition reaction of a polyethylene glycol halohydrin with diisocyanates.

The polyethylene glycol halides and particularly the dichlorides and diiodides are particularly advantageous for reaction with the primary monoamines in forming the new products.

In the present invention use is being made of the bifunctional nature of the primary amine and the reaction is carried out under such conditions that substantially both of the hydrogens of the primary amine will enter into the alkylation reaction. In order to assure that the reactivity of the primary amine and the intermediate secondary amine is preserved, the reaction is carried out in the presence of an acid acceptor such as sodium carbonate, sodium hydroxide, potassium hydroxide, and the like. If acid acceptors were not present, a portion of the amino groups would be converted into their salt with the formed by-product hydrohalides and other acids formed in the alkylation reaction, and consequently the amino groups would lose their reactivity to some extent. Therefore, under the usual reaction conditions, the reaction would stop before the starting materials are substantially converted into the linear polymers.

The amount of acid acceptor or alkali used should be approximately the stoichiometric equivalent to the amount of by-product acid formed during the alkylation reaction.

In carrying out the process of reacting the primary monoamines and the nitrogen alkylating diesters to produce the new reaction products, the monoamines and the alkylating diesters are mixed in the desired proportions together with a suitable acid acceptor and solvent. After the admixture of the starting materials, the alkylation reaction takes place. The reaction will, in some cases, proceed at room temperature, while in other cases elevated temperatures are used to carry out the reaction.

The reaction can in some instances be carried out in the absence of solvents or in the presence of solvents such as water or organic solvents such as ethylene glycol and isopropyl alcohol. It is advantageous to use a solvent in which the acid acceptor or alkali used would dissolve to some extent.

The soluble polymers of this invention are linear polytertiary amines. These soluble linear polytertiary amines can subsequently be converted by further reaction with alkylating diesters into insoluble cross-linked polymers.

In forming the linear polymers of this invention the formation of some quaternary ammonium groups may result by reaction of the polymeric molecules with the alkylating agent. If the resulting polymer is to be obtained in soluble form the quaternization with the alkylating diesters substantially exceeding the formation of one quaternary group per polymeric molecule should be avoided.

The primary monoamines and the alkylating diesters can be used in various proportions. It is advantageous to use approximately equimolecular proportions to form the linear polytertiary amines. When using approximately (within about 10%) equimolecular proportions of the primary monoamine and the alkylating diester the reaction can be carried to substantial completeness to form the soluble polytertiary amine polymers of this invention. When using an alkylating diester in proportions much in excess of 10% of the equimolecular proportions the reaction should be stopped before it is completed if a soluble product is desired. The reaction with the primary monoamine much in excess of 10% of the equimolecular proportions will result in the formation of a soluble product of lower molecular weight than can be obtained by the use of approximately equimolecular proportions. Soluble polytertiary amines produced according to this invention can be further reacted with alkylating diesters to form the insoluble polymers. The alkylating diesters used to form the insoluble polymers can be the same as or different from the alkylating diester used to form the soluble polytertiary amines.

The end groups in the linear polymer can be secondary amino groups and in the subsequent reaction with a dihalide can be converted into tertiary amino groups. By using an excess of an alkylating diester end groups can also be formed by the ester group of the alkylating diester.

The linear polytertiary amines obtained are soluble in water or in non-aqueous solvents depending upon the nature of the alkyl group present in the original primary monoamine and the nature of the alkylene group present in the alkylating dihalide or diester molecule. By using comparatively short alkylene groups, water soluble products are obtained. The water solubility is also increased when the alkylating diester contains polar groups such as ether oxygen as it is with the cases in polyethylene glycol dihalides, for example. Solubility in organic solvents is promoted by using a higher alkyl or alkene radical in the primary monoamine.

The linear polytertiary amines can be converted into an insoluble large molecule by further reacting it with bifunctional or polyfunctional alkylating diesters in such a ratio that each polyamine molecule contains substantially more than one quaternary group generating a two or three dimensional network. A smaller or larger ratio of tertiary amino groups can be converted into quaternary ammonium groups by controlling the reaction conditions and the reactivity of the reactants.

The resins or gels produced as cross-linked polymers have ion exchange properties and are useful as ion exchange materials.

Instead of producing the insoluble products by themselves, they can be produced in the presence of an inert material or carrier such as silica gel or other refractory as a carrier of the ion exchange products. The production of the insoluble cross-linked polymers in the manner described enables the properties of the products to be determined from the standpoint of the extent of their reaction and their ion exchange properties.

The water soluble products of the invention can be advantageously used for the impregnation of textile materials. When applied to textiles in combination with bifunctional or polyfunctional alkylating agents and heated, they are converted in situ to an insoluble finish. This finish increases the value and usefulness of textile materials. In particular, it reduces the tendency of the textile material to accumulate electrostatic charges.

It is known to the trade that impregnation of hydrophobic textile materials with certain compounds greatly reduces their tendency to accumulate electrostatic charges. Such compounds are commonly called antistatic agents or finishes. However, practically all these finishes are removed by laundering, dry-cleaning, or by mere rinsing with water.

There is a definite need for a finish or treatment which would impart to textiles the property of dissipating electrostatic charges and which would withstand repeated laundering and dry-cleaning. Such a finish can be termed a durable antistatic finish.

The compounds of the invention when properly applied to hydrophobic textile materials, act as durable antistatic finishes, extremely resistant to washing and dry-cleaning. The appearance and hand of the cloth are not unfavorably affected by the finish, and at the same time it is possible to impart a wide range of properties to the treated cloth (e.g. stiffness, softness, body) by adequately choosing the raw materials for the addition product applied.

Another extremely useful property of our new finishes is to adsorb from an aqueous bath acid dyes and to hold them. Use can be made of this property to dye economically textile materials made from hydrophobic or cellulose fibers. Hydrophobic fibers can be dyed with known methods only with the aid of high pressure or with the assistance of certain compounds called carriers or with a selected and limited group of dyes. These dye methods impose severe limitation on the selection of color and depth of color and they are usually costly.

Our new finish enables the finished fabric to be dyed by members of the large group of acid or wool dyes at comparatively low cost.

An outstanding property of the new finish is to reduce or eliminate the tendency of textile materials consisting of or prepared from hydrophobic fibers and filaments to accumulate electrostatic charges.

Hydrophobic fibers are synthetic fibers which have a comparatively low capacity to retain moisture in comparison with such fibers as cotton, wool, and rayon. Such fibers are nylon fibers (e.g. those called nylon 66 which are prepared by condensation of 1,6 hexamethylene diamine and adipic acid; those called nylon 6 which are prepared by polymerization of 6-amino caproic acid); Orlon acrylic fibers (Orlon is a trademark of the E. I.

du Pont de Nemours & Co.) prepared by polymerization of acrylonitrile; Dacron polyester fibers (Dacron is a trademark of the E. I. du Pont de Nemours & Co.) prepared by condensation of terephthalic acid and ethylene glycol; cellulose triacetate fibers (marketed under the trademark Arnel by the Celanese Corporation of America); Dynel fibers (Dynel is a trademark of the Carbide & Carbon Chemical Co., a division of Union Carbide Corp.) which are copolymers of acrylonitrile and vinyl chloride; Acrilan fibers (Acrilan is a trademark of the Chemstrand Corp.) and similar synthetic fibers.

Textile materials prepared from hydrophobic fibers accumulate electrostatic charges when exposed to rubbing, e.g. in processing where the filament or fiber and its assemblies are led over guides, or in weaving, or even in use and wear.

In processing, accumulation of electrostatic charges may cause yarn ends to stick or tangle severely on machines. Charged fabrics may attract and hold tenaciously lint and soil, and they are often difficult to cut and sew. Finished garments have a tendency to cling to the body, and spark discharges may also occur, which in some instances (such as in the operating room, in electronic research laboratories, etc.) constitute a significant hazard.

The accumulation of charges is assumed to be due to the inability of the textile materials to dissipate the charges as fast as they are generated by rubbing. An adequate measure of the ability of the textiles to dissipate charges is their electrical conductance (or electrical resistivity which is the reciprocal value of conductance). It is known that a specific area conductivity of the textile material higher than $10^{-12}$ reciprocal ohm (i.e. a specific area resistivity lower than $10^{12}$ ohm) is sufficient to consider the textile material as having no objectionable tendency for the accumulation of charges. A higher specific area resistance is usually indicative of the tendency to accumulate charges.

We define the specific area resistivity of the fabric as its electrical resistivity between two parallel metallic electrodes placed at a distance equal to their length. When the distance between electrodes is $n$ times their length, the measured resistance must be divided by $n$ in order to obtain the specific area resistance. The instruments used to measure electrical resistance are well known, e.g. a Wheatstone bridge may be used, or a strip of fabric is placed between electrodes connected across a device for measuring electric potential (voltage) having a very high leakage resistance and a potential is then applied across the fabric; the source of potential is then disconnected from the electrodes. From the observed rate of discharge of the initial potential and from the capacitance of the system the specific area resistivity can be calculated.

The electric resistance of textile materials depends on their moisture content, which in turn is a function of the relative humidity of the surrounding atmosphere. Therefore measurement of electrical resistivity of the fabric must be carried out at a known relative humidity level in order to give reproducible results. Most of our measurements, as indicated in the following examples, were carried out at relative humidity between 30% and 50%.

The invention will be further illustrated by the following examples, but it will be understood that the invention is not limited thereto. The parts are by weight.

*Example 1*

18.6 parts of anhydrous methylamine, 112.3 parts of the dichloride of triethylene glycol, 305 parts of ethylene glycol, and 127.3 parts of sodium carbonate were mixed in an autoclave equipped with mechanical agitator and thermometer well. The autoclave was heated in an oil bath. The temperature of the mixture was held at 120° C. for 1 hour (the pressure of the system did not exceed 48 lbs./in. Analysis for ionic chloride by argentometric titration indicated that 95.9% of the theoretical reaction had taken place. The salts were filtered off, leaving a clear yellow viscous product which consisted of a 30% active solution of the polytertiary amine in ethylene glycol.

*Example 2*

6.2 parts of anhydrous methylamine, 299 parts of the dichloride of polyethylene glycol 1540, 305.2 parts ethylene glycol, and 42.4 parts of sodium carbonate were mixed in an autoclave equipped with mechanical agitation and thermometer well. The mixture was heated in the autoclave by means of an oil bath at 130° C. for 3½ hours, during which time the internal pressure did not exceed 8½ lbs./in.$^2$. Analysis for ionic chloride indicated 91.5% conversion of the dichloride. The salts were filtered off leaving a clear yellow viscous product which consisted of a 50% active solution of the polytertiary amine in ethylene glycol.

*Example 3*

5.67 parts methylamine, 195 parts of the dichloride of polyethylene glycol 1000, 201 parts of ethylene glycol, and 38.8 parts of sodium carbonate were mixed in an autoclave equipped with mechanical stirrer and thermometer well. The mixture in the autoclave was heated by means of an oil bath to 128° C. and held at that temperature for 3 hours, the internal pressure not exceeding 8 lbs./in.$^2$. Analysis for ionic chloride indicated 90% conversion. The salts were filtered off leaving a clear yellow viscous product.

*Example 4*

15.5 parts methylamine, 171.5 parts of the dichloride of polyethylene glycol 300, 436 parts of ethylene glycol, and 106 parts of sodium carbonate were mixed in an autoclave equipped with mechanical agitator and thermometer well. The autoclave was heated in an oil bath raising the temperature of the mixture to 125° C. for 1 hour. The internal pressure of the autoclave did not exceed 17 lbs./in.$^2$. Analysis for ionic chloride showed that 91.5% of the theoretical reaction had taken place. The salts were filtered off leaving the product clear, viscous, and yellow.

*Example 5*

24.4 parts of monoethanolamine, 251.2 parts of the dichloride of polyethylene glycol 600, 275.6 parts of ethylene glycol, and 84.8 parts of sodium carbonate were mixed in a three-necked reaction flask equipped with mechanical agitator, thermometer, condenser, and heating mantle. The mixture was heated at 127° C. for 5 hours. Analysis for ionic chloride indicated that 96.8% of the theoretical reaction had taken place. 742 parts of water were added to give a 20% active solution of polytertiary amine which was dark yellow in color.

*Example 6*

22.8 parts of allylamine, 251.2 parts of the dichloride of polyethylene glycol 600, 274 parts of ethylene glycol, and 84.8 parts of sodium carbonate were mixed in an autoclave equipped with a mechanical agitator and thermometer well. The autoclave was heated in an oil bath, bringing the temperature of the mixture to 130° C. and held for 3 hours. 737 parts of water were added and the mixture was placed in a separatory funnel. 630 parts of water containing inorganic salts were split out and removed. 630 parts of water were added to give a 20% solution of deep yellow color. The water-salt layer and the product were analyzed for the amount of ionic chloride present, and the total amount found indicated that 92.1% of the theoretical reaction had taken place.

*Example 7*

156 parts of dodecylamine (Armeen 12D, manufactured by Armour Chemical Co.), 502.4 parts of the dichloride of polyethylene glycol 600, and 440 parts of ethylene glycol were mixed in a three-necked reaction flask equipped with mechanical agitator, thermometer, condenser, and heating mantle. The temperature of the mixture was raised to 150° C. and held for 4 hours. At specific intervals during the reaction, potassium hydroxide was added to amounts not to exceed stoichiometrically the amount of reaction which had taken place until 83.6 parts had been added. After the reaction time, the mixture was cooled and the salts were filtered off. Analysis of the salts removed and of the product indicated that 96% of the theoretical reaction had taken place. The resulting solution containing 60% polyamine was a dark red viscous liquid.

*Example 8*

25.3 parts n-hexylamine, 157 parts of the dichloride of polyethylene glycol 600, 182 parts of ethylene glycol, and 53 parts sodium carbonate were mixed in a three-necked reaction flask equipped with thermometer, mechanical agitator, condenser, and heating mantle. The temperature of the mixture was brought to 130° C. and held for 4½ hours. Analysis of the mixture for percent ionic chloride indicated that 88.5% of the reaction had taken place. The salts were filtered off using a Buchner funnel and vacuum. The product was a reddish colored viscous liquid consisting of a 50% active solution of polyamine in ethylene glycol.

*Example 9*

18 parts of ethylamine, 251.2 parts of the dichloride of polyethylene glycol 600, 269.2 parts of ethylene glycol, and 84.8 parts of sodium carbonate were mixed in an autoclave equipped with mechanical agitator and thermometer well. The autoclave was heated in an oil bath and the temperature of the mixture was brought to and held at 135° C. for a period of 3 hours. (Pressure did not exceed 28 lbs./in.$^2$.) 722.8 parts of water were then added to the mixture, which was placed in a separatory funnel. Two layers separated in approximately ½ hour. 471 parts of water containing salts were removed, and 471 parts of water were added to yield a 20% active solution which was yellow in appearance. Analysis of the aqueous layer removed and of the product for ionic chloride indicated that 94.5% of the theoretical reaction had taken place.

*Example 10*

17.85 parts methylamine, 366 parts of the dichloride of polyethylene glycol 600, 385 parts of ethylene glycol, and 121 parts of soda ash were mixed in a glass lined autoclave which was jacketed to hold steam pressure and was equipped with a mechanical means of agitation and a thermocouple. The mixture was heated to 128° C. and held at this temperature for 3½ hours. The internal pressure of the autoclave ranged at this temperature from 35 lbs./in.$^2$ to 45 lbs./in.$^2$. (The steam pressure in the jacket never exceeded 26 lbs./in.$^2$.) After the reaction time of 3½ hours a sample of the slurry was analyzed for percentage of ionic chloride, and it was found that 93.7% of the dichloride of polyethylene glycol 600 had reacted with the amine. 825 parts of water were added to the mixture after cooling to 80° C. in order to dissolve the salts and separate them in the aqueous layer. The temperature of the mixture, after the addition of the water, was raised to 90° C., the agitation was stopped, and the mixture was left standing for 1½ hours to split out the product. During a period of 4 hours, 453 parts of water and dissolved salts were removed. This was replaced with an equal weight of water to yield a 20% active solution of the polytertiary amine. The solution was clear and straw yellow in color.

*Example 11*

An undyed, bleached, taffeta fabric woven from Dacron polyester yarn was impregnated in a three-roll padder with an aqueous solution containing 40 parts of the product of Example 10 (20% solids) and 2.2 parts of polyethylene glycol 600 diiodide in 100 parts of water. The cloth was dried for 2 minutes at 90° C. The dry pickup or add-on was found to be 2.0 parts per 100 parts of fabric by weight. The dried fabric was placed in a curing oven and heated for 3 minutes at 150° C. The treated fabric showed a specific resistance of the order of $10^{10}$ ohms. After 70 launderings in a Westinghouse household washing machine at 60° C., the electrical resistance did not rise above $10^{11}$ ohms. A portion of the same fabric which had not been treated showed a specific resistance greater than $10^{14}$ ohms. This showed that the treated fabric even after a large number of launderings did not show any objectionable tendency to accumulate electrostatic charges.

*Example 12*

A desized, bleached, undyed, nylon taffeta fabric was impregnated in a three-roll padder with an aqueous solution containing 25 parts of the product of Example 10 (20% solids) and 2.8 parts of polyethylene glycol 1000 diiodide in 100 parts of water. The cloth was dried for 2 minutes at 90° C. The dry pickup or add-on was found to be 2.0 parts per 100 parts of fabric by weight. The dried fabric was placed in a curing oven and heated for 3 minutes at 150° C. The treated fabric showed a specific resistance of the order of $10^{10}$ ohms. After 20 launderings in a Westinghouse household washing machine at 60° C., the electrical resistance did not rise above $10^{11}$ ohms. A portion of the same fabric which had not been treated showed a specific resistance greater than $10^{14}$ ohms. This showed that the treated fabric, even after a large number of launderings, did not show any objectionable tendency to accumulate electrostatic charges.

*Example 13*

An undyed, bleached, taffeta fabric woven from Dacron polyester yarn was impregnated in a three-roll padder with an aqueous solution containing 38 parts of the product of Example 9 (20% solids) and 3.2 parts of polyethylene glycol 600 diiodide in 100 parts of water. The cloth was dried for 2 minutes at 90° C. The dry pickup or add-on was found to be 2.0 parts per 100 parts of fabric by weight. The dried fabric was placed in a curing oven and heated for 6 minutes at 150° C. The treated fabric showed a specific resistance of the order of $10^{10}$ ohms. After 30 launderings in a Westinghouse household washing machine at 60° C., the electrical resistance did not rise above $10^{11}$ ohms. A portion of the same fabric which had not been treated showed a specific resistance greater than $10^{14}$ ohms. This showed that the treated fabric, even after a large number of launderings, did not show any objectionable tendency to accumulate electrostatic charges.

*Example 14*

An undyed, bleached, taffeta fabric woven from Dacron polyester yarn was impregnated in a three-roll padder with an aqueous solution containing 16 parts of the product of Example 2 (50% solids) and 2.2 parts of polyethylene glycol 600 diiodide in 100 parts of water. The cloth was dried for 2 minutes at 90° C. The dry pickup or add-on was found to be 2.0 parts per 100 parts of fabric by weight. The dried fabric was placed in a curing oven and heated for 5 minutes at 160° C. The treated fabric showed a specific resistance of the order of $10^{10}$ ohms. After 25 launderings in a Westinghouse household washing machine at 60° C., the electrical resistance did not rise above $10^{11}$ ohms. A portion of the same fabric which had not been treated showed a specific resistance greater than $10^{14}$ ohms. This showed that the treated fabric after a large number of launderings did not show any objectionable tendency to accumulate electrostatic charges.

Example 15

A dyed, scoured fabric woven from Orlon acrylic fiber was impregnated in a three-roll padder to a wet pickup of approximately 50% with an aqueous solution containing 17.5 parts of the product of Example 10 (20% solids) and 1.7 parts of polyethylene glycol 600 diiodide in 106 parts of water. The cloth was dried at 90° C. on a frame and then heated in a curing oven for 3⅓ minutes at 150° C.

After curing the fabric was washed with a 0.1% solution of a non-ionic detergent at 40° C. and dried. The fabric thus treated showed a specific resistance of less than $10^{10}$ ohms. After 50 launderings in a household washing machine at 60° C., the specific resistance of the fabric did not rise above $10^{11}$ ohms. A portion of the same fabric which had not been treated, both before and after laundering, had a specific resistance greater than $10^{14}$ ohms.

We claim:

1. The process of preparing soluble linear polytertiary amines which comprises reacting;
   (a) a compound having the following general formula:

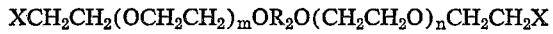

wherein $R_2$ is an organic divalent radical, X is selected from the group consisting of chloride, bromide, iodide, sulfate, phosphate, methane sulfonate, and toluene sulfonate groups, $m$ and $n$ are average numbers between 3 and 40;
   (b) with an aliphatic primary monoamine;
   (c) in the presence of an acid acceptor.

2. The process of claim 1 in which the compound of (a) and monoamine of (b) are reacted in approximately equimolecular proportions.

3. The process of claim 1 in which X is chloride.

4. The process of claim 1 in which X is chloride and $R_2$ is —$CH_2CH_2$—.

5. A soluble polytertiary amine having the following formula:

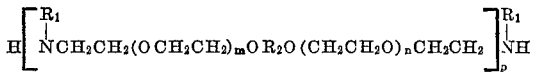

wherein $R_1$ is the residue of a primary monoamine after the removal of the primary $NH_2$ group, $R_2$ is an organic divalent radical, $m$ and $n$ are average numbers between 3 and 40, and $p$ is an integer greater than 1 and prepared by the process of claim 1.

6. The soluble polytertiary amine of claim 5 in which $R_2$ is —$CH_2CH_2$.—

7. The process of preparing an insoluble cross-linked amine polymer, which comprises reacting:
   (a) the polytertiary amine of claim 5 with;
   (b) a compound selected from the group consisting of alkylene glycols, aralkylene glycols and polyethylene glycols in which the two terminal OH groups of the glycols are replaced by a member of the group consisting of chloride, bromide, iodide, sulfate, phosphate, methane sulfonate, and toluene sulfonate groups;
   (c) in an amount sufficient to form said insoluble crosslinked amine polymer.

8. The product prepared according to the process of claim 7.

9. The process of treating hydrophobic textile materials which comprises:
   (a) impregnating a hydrophobic textile material with the soluble polytertiary amine of claim 5, and reacting therewith;
   (b) a compound selected from the group consisting of alkylene glycols, aralkylene glycols, and polyethylene glycols in which the two terminal OH groups of the glycol are replaced by a member of the group consisting of chloride, bromide, iodide, sulfate, phosphate, methane sulfonate, and toluene sulfonate groups;
   (c) in an amount sufficient to form a water insoluble reaction product on the textile material.

10. The process of treating hydrophobic textile materials which comprises:
    (a) impregnating a hydrophobic textile material with the reaction product of a primary monoamine and a substantially equimolecular portion of the dichloride of polyethylene glycol, and reacting therewith;
    (b) the diiodide of polyethylene glycol;
    (c) in an amount sufficient to form a water insoluble reaction product on the textile material.

11. Hydrophobic textile materials impregnated and treated by the process of claim 9.

12. Hydrophobic textile materials impregnated and treated by the process of claim 10.

References Cited in the file of this patent

UNITED STATES PATENTS

| | | |
|---|---|---|
| 2,136,928 | Schlack | Nov. 15, 1938 |
| 2,243,329 | De Groote | May 27, 1941 |
| 2,323,658 | Hester | July 6, 1943 |
| 2,560,280 | Benneville | July 10, 1951 |
| 2,683,147 | Girod | July 6, 1954 |
| 2,702,797 | Rugg | Feb. 22, 1955 |
| 2,766,288 | Erickson | Oct. 9, 1956 |